US012786012B2

(12) United States Patent
Pham et al.

(10) Patent No.: US 12,786,012 B2
(45) Date of Patent: Nov. 3, 2026

(54) SECURITY GATEWAY ADAPTER

(71) Applicant: Innova Electronics Corporation, Irvine, CA (US)

(72) Inventors: Phuong Pham, Fountain Valley, CA (US); Keith Andreasen, Garden Grove, CA (US); Thuan Huynh, Ho Chi Minh City (VN); Ninh Do, Ho Chi Minh City (VN); Tuan Le, Ea H'Leo/Dak Lak (VN)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 19/070,992

(22) Filed: Mar. 5, 2025

(65) Prior Publication Data

US 2026/0270112 A1 Sep. 10, 2026

(51) Int. Cl.
*H04L 29/06* (2006.01)
*G07C 5/08* (2006.01)
(Continued)

(52) U.S. Cl.
CPC ............ *H04L 12/66* (2013.01); *G07C 5/0808* (2013.01); *H04L 63/0807* (2013.01); *H04L 63/107* (2013.01); *G07C 2205/02* (2013.01)

(58) Field of Classification Search
CPC ... H04L 12/66; H04L 63/0807; H04L 63/107; G07C 5/0808; G07C 2205/02
See application file for complete search history.

(56) References Cited

U.S. PATENT DOCUMENTS 12,106,671 B1 * 10/2024 Basra .................. G06F 11/3089
2017/0093866 A1 * 3/2017 Ben-Noon .............. G06F 21/35
(Continued)

FOREIGN PATENT DOCUMENTS

EP 3113529 B1 * 9/2020 ............ H04W 12/10
WO WO-2019067002 A1 * 4/2019 ........... H04L 9/3239

OTHER PUBLICATIONS

Haichun Zhang; Yuqian Pan; Zhaojun Lu; Zhenglin Liu; "A Cyber Security Evaluation Framework for In-Vehicle Electrical Control Units"; IEEE Access; Year: Nov. 11, 2021 | vol. 9 | Journal Article | Publisher: IEEE; pp. 149690-149706 (Year: 2021).*
(Continued)

*Primary Examiner* — Fatoumata Traore
*Assistant Examiner* — Courtney D Fields
(74) *Attorney, Agent, or Firm* — Stetina Garred Brucker & Newboles

(57) ABSTRACT

An adapter device bidirectionally interconnects a diagnostic scan tool to an electronic control unit through the security gateway of a vehicle. A scan tool interface is connectable to the diagnostic scan tool, and a vehicle network interface is connectable to a data link connector of the vehicle. A wireless communications module is connectable to a remote server. A security gateway bypass opens and maintains a validated communication link session with the security gateway through the vehicle interface based upon a presentation of an access credential thereto received from the remote server in response to an authentication request with a security authorization token. A data transfer and control processor is receptive to scan tool commands and data from the diagnostic scan tool through the scan tool interface, and to vehicle data from the electronic control unit through the vehicle network interface.

25 Claims, 4 Drawing Sheets

(51) Int. Cl.

| | |
|---|---|
| ***H04L 9/40*** | (2022.01) |
| ***H04L 12/66*** | (2006.01) |
| *H04L 29/08* | (2006.01) |
| *H04W 12/10* | (2021.01) |
| *H04W 12/12* | (2021.01) |

(56) References Cited

U.S. PATENT DOCUMENTS

| | | | | |
|---|---|---|---|---|
| 2021/0166501 | A1* | 6/2021 | Rupani | G07C 5/008 |
| 2021/0288801 | A1* | 9/2021 | Kulkarni | H04L 9/0631 |
| 2026/0075039 | A1* | 3/2026 | Wyas | H04L 63/0281 |

OTHER PUBLICATIONS

Webpage for Autel UK Product; FCA Gateway Tokens: https://www.autel.uk/products/autel/?model [] =fca-secure-gateway-tokens &sort=date_created&order=desc Nov. 29, 2023.

Webpage for Autel UK Product; Renault Secure Gateway Tokens: https://www.autel.uk/products/autel/?model [] =renault-secure-gateway-tokens&sort=date_created&order=desc Nov. 29, 2023.

Webpage for Obdgenie Product: Obdgenie.com Jun. 26, 2016.

Launch Europe GmbH; You Tube Video; “Launch Europe, Unlock the Security Gateway, Module for Renault;” Feb. 3, 2023; https://www.youtube.com/watch?v=hS7roilWEa4.

* cited by examiner

SECURITY GATEWAY ADAPTER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to automotive vehicle electronics systems and cybersecurity therefor, and more specifically to a security gateway adapter for gaining access to vehicle electronics subsystems.

2. Related Art

Modem automotive vehicles are heavily reliant on electronic systems, with practically every operational aspect involving some level of computer control. Environmental and component operation data as well as command inputs are processed to yield functional responses on various vehicle subsystems. Although there are some variations in names and groupings, and there may be some overlap in group memberships, automotive electronics may be generally divided into powertrain systems, chassis systems, safety systems, driver assistance and passenger comfort systems, and entertainment/infotainment systems.

Each of these systems may be controlled by dedicated data processors with inputs that are connected to sensors and user input devices, along with outputs that are connected to a component that modifies the operation of an output device. For example, the engine control unit, which may be referred to as an ECU, is receptive to throttle control inputs from the driver foot pedal, as well as environmental/operational data from oxygen sensors, ambient temperature thermometers, air-fuel ratio sensors, and so on. In response to an increased throttle input, the ECU may direct additional fuel to the injection system. The additional delivery of fuel may result from the ECU driving a motor that pumps an additional volume of fuel. To ensure that an optimal air-fuel ratio is maintained to comply with emissions standards, the amount of fuel delivered may be reduced. This is one example of the input-process-output sequence of an electronic subsystem of a vehicle, and is applicable to other contexts.

There were minimal levels of integration across these multiple vehicle electronics subsystems in earlier vehicles, and most systems operated independently of others. However, improved safety and efficiency are possible where these subsystems are integrated. For instance, a driver assistance feature such as adaptive cruise control may cooperate with the drivetrain systems to maintain steady throttle control while being responsive to sudden events by cooperating with the braking system. The detection of such events may be possible through dedicated sensors, e.g., radar sensors, or may obtain visual data from onboard cameras.

Each of these electronics subsystems may be networked together over a single data transfer bus (e.g., the vehicle Controller Area Network or CAN bus), and their presence on the network enables diagnostics thereof over a single interface. Vehicles are now required to implement the On-Board Diagnostics-II (OBD-II) standard, which specifies particular data communication and connector pinout standards as well as the diagnostic trouble code (DTC) data structure. In the context of the overall vehicle electronics system, there may be a central electronic control unit/ECU that manages functionalities of the vehicle beyond the engine, so the ECU abbreviation may have a broader meaning depending on the context. A third-party scan tool or other diagnostic tool may be connectible to the vehicle via a data port to download DTCs from the ECU and/or send commands and other data to the ECU.

Because granting access to the ECU means allowing control over entire operation of the vehicle, unrestricted access leaves the vehicle and its occupants vulnerable to attack. Accordingly, many vehicle manufacturers, also referred to as OEMs or Original Equipment Manufacturers, have incorporated security gateways (SGWs) into the electronics system. Different OEMs and groups of OEMs implement the security gateway in different ways in terms of authentication protocols and access permissions. For example, Fiat/Chrysler/Jeep may have a different security gateway than Nissan/Infinity, which may still be different from Volkswagen/Audi, and so on.

Regardless of the specifics of implementation, the security gateway is used to protect against cyberattacks and to serve as a protective barrier between the internal electronics systems of the vehicle and external networks and devices that may attempt to gain access thereto. Furthermore, traffic on the network may be monitored and filtered to prevent malicious attacks that may ultimately disable the vehicle, destroy the vehicle, allow for the theft of the vehicle, or otherwise place the driver and any occupants at risk of physical harm. A security gateway may also be utilized for data privacy reasons. Sensitive information about drivers, their vehicles, and vehicle performance may be safeguarded by enforcing privacy policies, encrypting communications, and preventing unauthorized access to or interception of data. Authentication and access control policies may be enforced by the security gateway to prevent interference with other onboard software that manages the operation of the vehicle, and access to sensitive data. Because recent vehicles are heavily dependent on reliable software, much development efforts are focused thereon. Accordingly, software updates are being increasingly delivered over-the-air directly to the vehicles, rather than being updated by dealers and other authorized mechanics. The integrity of such software updates may be assured when the manufacturer servers communicate with the vehicle through the security gateway. The reverse data traffic that may traverse the link between the manufacturer servers and the vehicle ECU, such as vehicle diagnostic data may also be secured when transmitted through the security gateway.

Access to the vehicle ECU by third-party OBD-II scan tools was typically a matter of connecting the device to the Data Link Connector (DLC). With a security gateway adapter in place, however, the functionality of the scan tool may be restricted to data read functions only, and performing data write functions or issuing commands to the vehicle, such as erasing fault codes, capturing live data, performing active tests, and other special functions may not be possible without being granted access by the security gateway. The vehicle OEM may have policies to limit these functionalities to known, identified users that have been pre-validated/verified and have established accounts. Such users may also have paid substantial license fees for the privilege of access. Moreover, the validation protocols and the process of submitting access credentials may be propriety to the vehicle OEM, so for all practical purposes, OEM-provided scan tools may be required to be used to perform diagnostics and repairs.

Accordingly, there is a need in the art for a device that can permit access to the full range of data and functions available from the vehicle ECU by third party scan tools that may otherwise be restricted by the security gateway. This provides additional options for vehicle owners to perform their own repairs, or hire independent mechanics with reduced service charges in comparison to manufacturer/dealer repair shops. What is therefore needed is a security gateway adapter.

BRIEF SUMMARY

According to one embodiment of the present disclosure, there may be an adapter device that bidirectionally interconnects a diagnostic scan tool to an electronic control unit through the security gateway of a vehicle. The adapter device may include a scan tool interface that is connectable to the diagnostic scan tool. Additionally, there may be a vehicle network interface that is connectable to a data link connector of the vehicle. The adapter device may further include a wireless communications module that is connectable to a remote server. Furthermore, there may be a security gateway bypass that opens and maintains a validated communication link session with the security gateway through the vehicle interface. This validated communication link session may be opened and maintained based upon a presentation of an access credential thereto that is received from the remote server in response to an authentication request that includes a security authorization token. The adapter may further include a data transfer and control processor that is receptive to scan tool commands and data from the diagnostic scan tool through the scan tool interface and relayed to the electronic control unit over the validated communication link session. The data transfer and control processor may also be receptive to vehicle data from the electronic control unit through the vehicle network interface over the validated communication link session and relayed to the diagnostic scan tool through the scan tool interface.

According to another embodiment of the present disclosure, there may be a method for establishing a bi-directional communication session between the diagnostic scan tool and the security gateway of a vehicle over a security gateway adapter. The method may include connecting the security gateway adapter to a data link connector of the vehicle. There may also be a step of retrieving an access credential from a remote server. Thereafter, there may be a step of presenting the access credential to the security gateway. The method may continue with opening a validated communication link session with the security gateway. Then, there may be a step of receiving scan tool commands and data from the diagnostic scan tool. The method may continue with transmitting the scan tool commands and data to electronic control units of the vehicle over the validated communication link session with the security gateway. The electronic control units may be connected to the security gateway adapter indirectly through the security gateway. There may also be a step of receiving vehicle data from the electronic control units of the vehicle over the validated communication link session with the security gateway. The method may also include transmitting the vehicle data to the diagnostic scan tool.

Yet another embodiment of the present disclosure may be a vehicle security gateway auxiliary access system. The system may include a security gateway adapter that is connectable to a diagnostic scan tool and a vehicle network interface of a vehicle. The security gateway adapter may include a wireless communications module. The system may also include a computing device that is connectable to the wireless communications module of the security gateway adapter over a first modality and a second modality. The computing device may further be connectable to a remote server to retrieve an access credential provided thereby in response to a presentation of an authentication request that includes a security authorization token that is retrieved from the vehicle. The access credential may be presented by the security gateway adapter to the security gateway to establish a validated communication link session. Scan tool commands and data from the diagnostic scan tool may be relayed to electronic control units behind the security gateway over the validated communication link session. Vehicle data from one or more of the electronic control units may also be relayed to the diagnostic scan tool over the validated communication link session.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a security gateway adapter and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
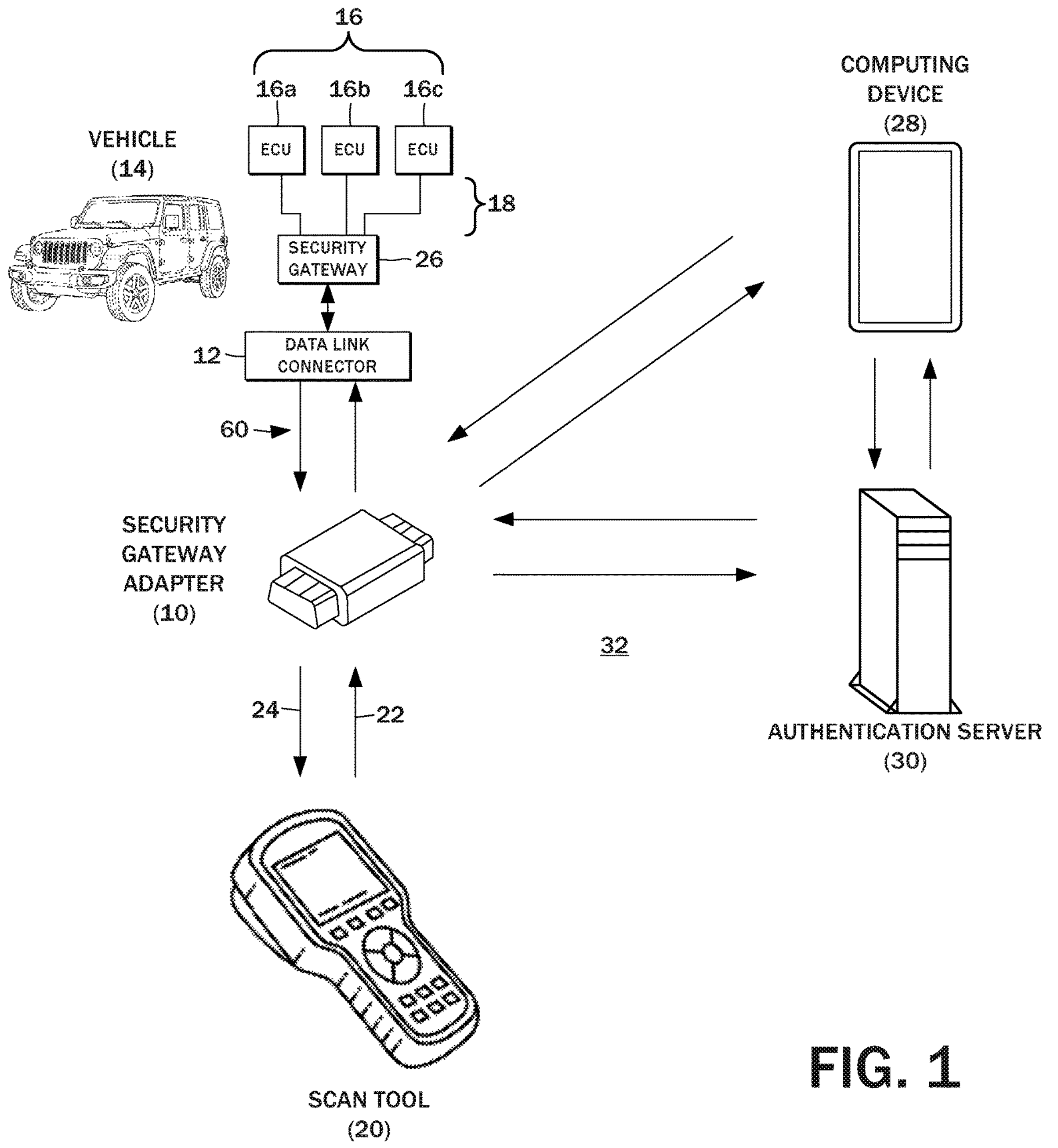
FIG. 1 is a block diagram illustrating a vehicle security gateway auxiliary access system including a security gateway adapter connectible to the vehicle, a scan tool connectible to the security gateway adapter, a computing device, and an authentication server.

With reference to the block diagram of FIG. 1, various embodiments of the present disclosure contemplate a security gateway adapter 10 that is connectable to a data link connector (DLC) 12 of an automotive vehicle 14. The vehicle 14 includes various subsystems, the operations of each of which may be managed by an electronic control unit (ECU) 16 that are all interconnected over an onboard data communications network 18. Illustrated are a first ECU **16*a*** which may, for example, control the operation of the vehicle engine, a second ECU 16*b* which may, for example, control the operation of the suspension, a third ECU 16*c* may be, for example, control the operation of the active safety systems. Those having ordinary skill in the art will recognize that there may be additional functional subsystems, each being controlled by a separate ECU 16, and the specific examples presented herein are not intended to be limiting. In some vehicles, the onboard data communications network 18 may be a CAN (controller area network) bus. However, the data communications network may be implemented as an Internet Protocol (IP) network in which each ECU 16 is represented as a node with a specific IP address.

The ECUs 16 may be implemented with microcontrollers that have a data processor capable of receiving inputs, executing preprogrammed instructions, and generating outputs based upon the received inputs and in accordance with the software instructions. The microcontroller may include memory for storing data and instructions, as well as communications/data networking components that enable the intercommunication with the other subsystems/ECUs 16 of the vehicle. The inputs may be comprised of various sensors and other feedback modalities pertaining to the operating components of that particular subsystem, while the outputs may be comprised of control signals that are generated to motors, actuators, indicators, and other such components that modify the operation of the components of the subsystem.

Besides the operational functions, the ECUs 16 may also be capable of performing diagnostics and reporting sensor and other captured data. The origin of the commands to initiate these diagnostics, and the destination of the data generated in response, may be a scan tool 20. The scan tool 20 may be connected to the vehicle 14 via the security gateway adapter 10, which in turn is connected to the data link connector 12. The scan tool 20 may transmit commands and other data 22 to the ECUs 16, such as requests to run a diagnostic procedure, clear diagnostic trouble codes (DTC), access live operating data, and perform other functions. After these requests are executed by the ECUs 16, vehicle data 24 may be reported back to the scan tool 20 for presentation to the user thereof.

As the ECUs 16 control the operation of the vehicle 14 while also including network modalities that allow for remote access thereto, more recent vehicles 14 there may include a security gateway 26 that limits such access. In some implementations, the security gateway 26 regulates all data traffic on the onboard data communications network 18, as well as all incoming and outgoing data traffic to/from the data link connector 12.

In accordance with various embodiments of the present disclosure, the security gateway adapter 10 is also connectible to a computing device 28 to perform additional functions that will be described in further detail below. The computing device 28 may be a tablet, a smartphone, or other such portable device that includes a data processor, a display screen, and one or more wireless communications modalities for local area networking such as WiFi, as well as short-distance transmissions such as Bluetooth® and Bluetooth Low Energy. Furthermore, various third-party applications may be installed onto the computing device 28 that run on the Android mobile device platform or the iOS mobile device platform. Although the computing device 28 is depicted as a mobile device, this is by way of example only and not of limitation. The computing device 28 may also be a conventional computer running a desktop-class operating system such as Windows, MacOS, Linux, and the like.

Automotive manufacturers may limit access to the ECUs 16 through the security gateway 26 to only those with access credentials granted thereby. In this regard, there may be an authentication server 30 that provides access credentials that are presented by the security gateway adapter 10 to the security gateway 26 to thereafter lift any restrictions for data traffic to the ECUs 16. The security gateway adapter 10 may communicate directly with the authentication server 30, or indirectly through the computing device 28. That is, the computing device 28 may connect to the authentication server 30 to retrieve the access credentials, which are then relayed to the security gateway adapter 10 for presentation to the security gateway 26. Thus, an embodiment of the present disclosure contemplates the security gateway adapter 10, the scan tool 20, and the computing device 28 as being part of a security gateway auxiliary access system 32.

Figure 2:
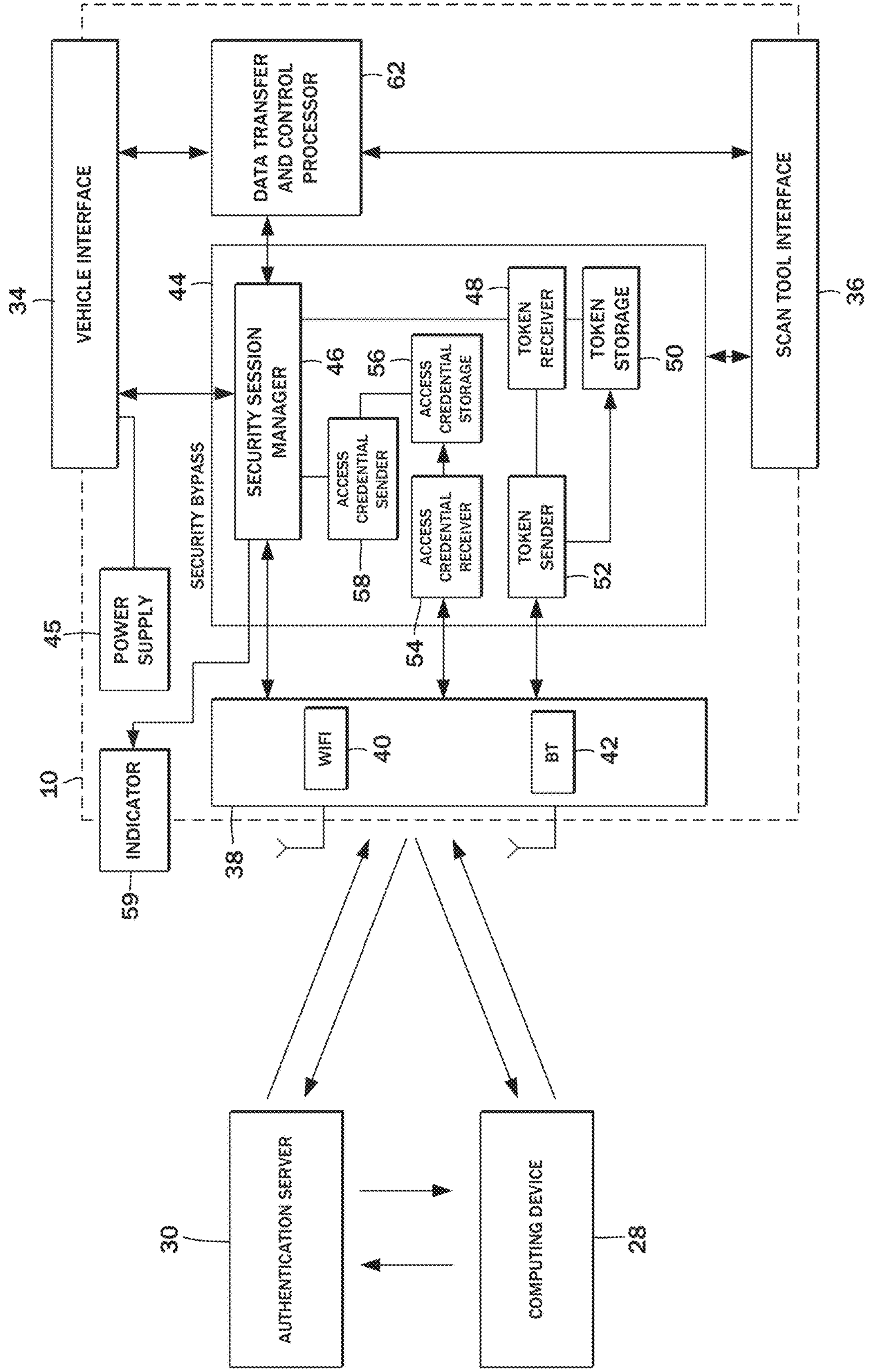
FIG. 2 is a detailed block diagram illustrating the various components of the security gateway adapter.

Referring now to the block diagram of FIG. 2, additional details of an exemplary embodiment of the security gateway adapter 10 will be considered. As noted above, the security gateway adapter 10 is connectable to the data link connector 12 of the vehicle 14 as well as the scan tool 20. Accordingly, the security gateway adapter 10 includes a vehicle interface 34 that encompasses the physical and logical connections between the security gateway adapter 10 and the vehicle 14. Furthermore, there is a scan tool interface 36 that likewise encompasses the physical and logical connections between the scan tool 20 and the security gateway adapter 10. The security gateway adapter 10 is contemplated to be interposed between what was otherwise a direct connection between the scan tool 20 and the data link connector 12, so the physical port of the scan tool interface 36 and the vehicle interface 34 are understood to be compatible with each other. The data link connector 12 is an OBDII (On-Board Diagnostics II) port, so according to one embodiment, the vehicle interface 34 is likewise an OBDII connector. In some vehicles, the data link connector 12 is a socket that is receptive to a plug, so the vehicle interface 34 compatible therewith is correspondingly a plug. In such case, the scan tool 20 is understood to have a plug, so the scan tool interface 36 is a socket. This plug/socket interrelationship between the vehicle interface 34 and the scan tool interface 36 may be reversed depending on the particulars of the vehicle 14. The particular pinout configurations of the various OBDII ports referenced above are deemed to be within the purview of those having ordinary skill in the art and therefore will not be repeated for the sake of brevity.

In addition to aforementioned external interfaces of the vehicle interface 34 and the scan tool interface 36, the security gateway adapter 10 includes a wireless communications module 38. A variety of wireless communications modalities may be implemented. One such wireless communication modality may be WiFi, which provides local area networking with hotspots and other nodes connected thereto. The hot spots, in turn, may be connected to the Internet, so the wireless communications module 38 may be connectible to any other server/computer system also connected to the Internet, such as the authentication server 30. The wireless communications module 38 may therefore include a WiFi module 40, which is understood to include a transceiver, a front end, and a baseband module, among other features. Another wireless communication modality may be Bluetooth®, which implements short-distance wireless communications with nearby devices. Thus, there may be a Bluetooth module 42 that similarly includes a transceiver, a baseband module, and a front end.

The scan tool interface 36 is connected to a security bypass 44, which may be implemented with a microcontroller including a processor that can be programmed to execute instructions that implement the various modules thereof. The OBDII connector standard specifies a power and a ground line from the vehicle side, so there may be a power supply/regulator 45 that receives the electrical power signal from the vehicle interface 34 and distributes it to the microcontroller as well as the other electronic components of the security gateway adapter 10. Additional specifics of the microcontroller hardware will be omitted for the sake of brevity, as any commercially available microcontroller may be utilized.

Generally, the security gateway adapter 10 is contemplated to present access credentials to the security gateway 26 and maintain a validated data communications link session therewith so that commands and data from the scan tool 20 can be relayed to the ECUs 16. The security bypass 44 includes a security session manager 46 that controls the authentication process in cooperation with various subsidiary modules.

Gaining access to the security gateway 26 typically requires the presentation of an access credential that is generated by the manufacturer of the vehicle 14. A preliminary step in retrieving the access credential involves first presenting a security authorization token to the authentication server 30. In various embodiments, the access credential may be a certificate that is generated uniquely for the instance of the security gateway 26 and/or the vehicle 14. Therefore, the security authorization token from which such certificate is generated is also specific to the security gateway 26 and/or the vehicle 14. Enhanced levels of security may be possible by integrating vehicle location data into the security authorization token, effectively serving as a second authentication factor for generating the certificate. The security authorization token is retrieved by the token receiver 48 from the computing device 28, then stored in the token storage 50. The security session manager 46 communicates with the security gateway 26 to obtain vehicle information as well as security information, and based thereon, the security session manager 46 requests the appropriate security authorization token from the token storage 50 for verification with the authentication server 30. In each instance where a security authorization token is requested, a status thereof is recorded in the token storage 50 to track its remaining validity.

In one embodiment, the security session manager 46 directly connects to the authentication server 30. The token sender 52 transmits the security authorization token to authentication server 30. In response to this request, and with the security authorization token specific to the security gateway 26, an access credential may be generated and passed to an access credential receiver 54 of the security bypass 44. The access credential is stored in the access credential storage 56 for subsequent presentation to the security gateway 26 and gaining access to the same. The security session manager 46 then utilizes an access credential sender 58, which retrieves the access credential from the access credential storage 56 and transmits it to the security gateway 26. Once the security gateway 26 validates the access credential, the security session manager 46 and the security gateway 26 establish a bidirectional validated communication link session 60.

The connection between the security gateway adapter 10 and the authentication server 30 may be by way of a WiFi connection established by the WiFi module 40, also referred to as a second wireless communication modality. As will be recognized by those having ordinary skill in the art, certain information about the wireless network to which the security gateway adapter 10 joins as a node must be known to the same. Such information includes the name of the wireless network (e.g., SSID), a network password, and various other parameters.

To the extent that the security gateway adapter 10 has not yet joined any wireless networks, it may be necessary to transfer such information thereto. Accordingly, in one contemplated embodiment, the security gateway adapter 10 utilizes the Bluetooth module 42, also referred to as a first wireless communication modality, to establish a short-range data communications link to the computing device 28. It is understood that such short-range Bluetooth links do not require any pre-identification of open networks, and based upon a pairing process, previously unknown devices and hosts may establish such short-range data communications links. The WiFi network parameter data may be transmitted from the computing device 28 over the Bluetooth short-range data communications link for storage in the wireless communications module 38. In subsequent sessions, that is, in subsequent instances of connecting the security gateway adapter 10 to the vehicle 14, the wireless communications module 38 may automatically connect to the known wireless network and reach out to the authentication server 30 for the access credentials.

Figure 3:
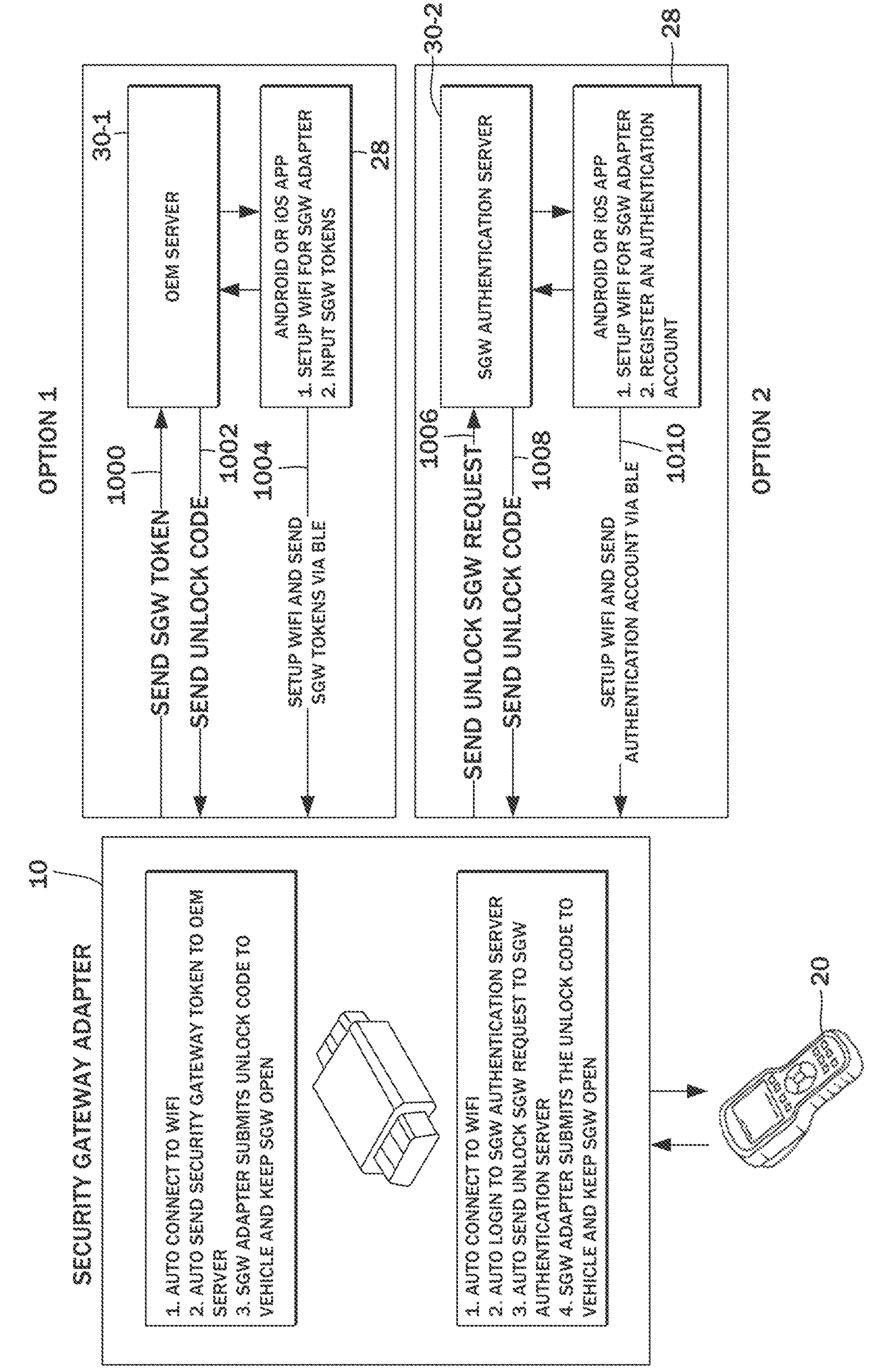
FIG. 3 is a diagram illustrating the operational modes of the security gateway adapter.

The block diagram of FIG. 3 illustrates additional details of the validation process, beginning with the automatic connection to a known WiFi network. The security authorization token is stored in the token storage 50, and likewise automatically sent to the authentication server 30 in a step 1000. In the illustrated example, the authentication server 30 is an OEM server 30-1 that is provided by the manufacturer of the vehicle 14. The OEM server 30-1 is understood to be the manufacturer-authorized modality to generate the access credentials needed for accessing the ECUs 16. The authentication server 30 then transmits the access credential to the security gateway adapter 10 in a step 1002, where it is presented to the security gateway 26. In a separate, precursor process, the computing device 28 may transfer WiFi network connection information to the security gateway adapter 10, as well as exchange security authorization tokens needed by the authentication server 30 to generate the access credentials in a step 1004.

An alternative validation process is also depicted in FIG. 3, also beginning with the automatic connection to a known WiFi network. Rather than the vehicle manufacturer-authorized OEM server 30-1, there may be an independent authentication server 30-2 to which the security gateway adapter 10 logs in. In similar fashion, however, an unlock request that is analogous to the presentation of the security authorization token is transmitted to the authentication server 30-2 in a step 1006. In response, an unlock code or the access credentials are sent to the security gateway adapter 10 in a step 1008. Separately, the computing device 28 may transfer the WiFi network connection information or otherwise set up the WiFi network connection to the security gateway adapter 10 in a step 1010. The computing device 28 may be used to access a web interface of the authentication server 30 to establish an account that is associated with the vehicle 14, and/or the security gateway adapter 10.

Because of the validation process and the establishment of the validated communication link session 60 is handled by the security gateway adapter 10, the status thereof maybe indicated by externally visible outputs 59. According to one embodiment, the outputs 59 may be LED indicator lights, though more sophisticated display screens that can output additional information regarding the status of the validation process and the validated communication link session 60 may also be incorporated in the security gateway adapter 10.

The security session manager 46 maintains the validated communication link session 60 with the security gateway 26 in an open state, allowing for bi-directional communications to occur between the scan tool 20 and the ECUs 16. In further detail, the security gateway adapter 10 includes a data transfer and control processor 62 that receives commands and other data 22 from the scan tool 20, and relays the same to the ECUs 16 over the validated communication link session 60. Vehicle data returned from the ECU 16 is similarly received on the vehicle interface 34 and the data transfer and control process are 62 and passed through the scan tool interface 36 for transmission to the scan tool 20.

According to one embodiment, the scan tool 20 and the ECUs 16 communicate over the OBDII standard, meaning that the commands and data packets are structured in accordance with the standard. Thus, the data transfer and control processor 62 only needs to relay the data packets to and from the vehicle interface 34 and the scan tool interface 36 without additional processing. The functionality of the security gateway adapter 10 to complete the validation process with the security gateway 26 allows older or less-featured scan tools 20 that do not incorporate security gateway validation functions may continue to be used with the vehicle 14 over the validated communication link session 60 established by the security gateway adapter 10.

Figure 4:
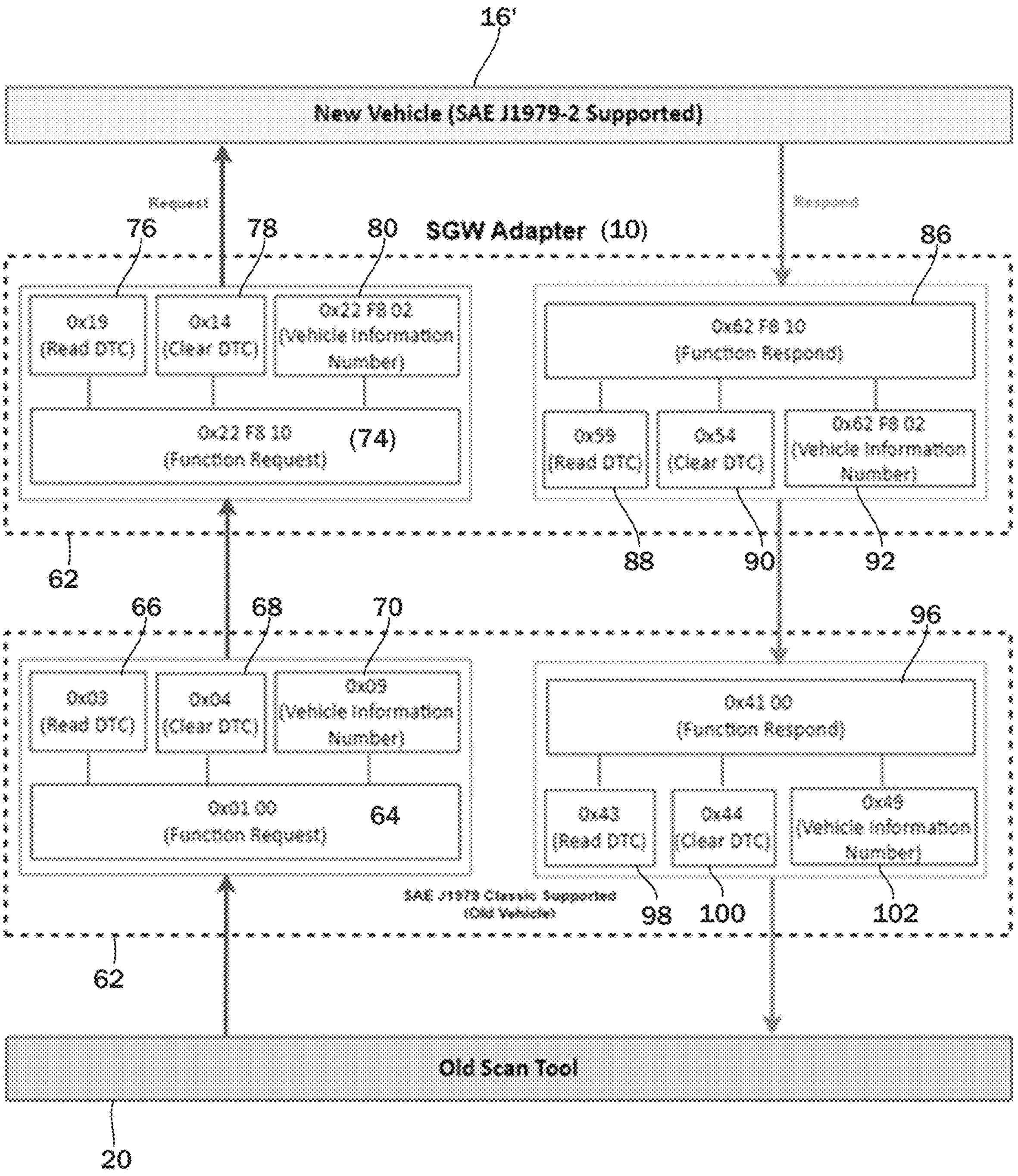
FIG. 4 is a diagram illustrating the translation of scan tool commands and data from a first protocol to a second protocol.

Newer vehicles 14 may implement the Unified Diagnostics Services protocol (OBDonUDS-SAE J1979-2) that may render older OBDII scan tools 20 unusable therewith. With reference to FIG. 4, the data transfer and control processor 62 may also be utilized to translate the OBDII commands and data from the scan tool 20 to the OBDonUDS ECU 16'. For example, a function request 64 conforming to the older SAE-J1979 standard may be specified by hex value 0x01 00. A read diagnostic code command 66 may be specified by hex value 0x03, whereas a clear diagnostic code command 68 may be specified by hex value 0x04. A vehicle information number 70 may be preceded by a hex value 0x09. The data transfer and control processor 62 may translate the function request 64 to new function request 74 with a hex value 0x22 F8 10. Likewise, the read diagnostic code command 66 may be translated to a new diagnostic code command 76 with a hex value 0x19, and the clear diagnostic code command 68 may be translated to a new clear diagnostic code command 78 with a hex value 0x14. The vehicle information number 70 may be preceded by a new vehicle information number 80 with a hex value 0x22 F8 02. Such data packets may then be passed to the OBDonUDS ECU 16'.

The responses from the OBDonUDS ECU 16' may similarly be translated by the data transfer and control processor 62 from the J1979-2 protocol data packets to the J1979 protocol data packets. The OBDonUDS ECU 16' generates a function respond 86 with a hex value 0x62 F8 10, with a read diagnostic code status 88 with a hex value 0x59, a clear diagnostic code status 90 with a hex value 0x54, and a vehicle information number 92 header with a hex value 0x62 F8 02. These are translated to old function respond 96 with a hex value 0x41 00, a read diagnostic code status 98 with hex value 0x43, an old clear diagnostic code status 100 with hex value 0x44, and an old vehicle information number header 102 with a hex value 0x49, respectively. The SAE 1979-compliant responses may thereafter be recognized by the scan tool 20 compliant with such older standard. This is contemplated to ensure compatibility with any scan tool regardless of the standard to which it conforms.

Still other vehicles 14 may utilize Diagnostics over Internet Protocol (DoIP), where each of the ECUs 16 are nodes in a local area IP network. In such case, the vehicle interface 34 may be an Ethernet connector, and the data transfer and control processor 62 further implements a client application that communicates directly with the ECUs 16. As with the OBDII/CAN bus implementations described above, diagnostic requests may be transmitted to the vehicle 14, with individual ECUs 16 executing the diagnostic routines the responses are sent back to the security gateway adapter 10 through the network, with such responses containing information about the systems of the vehicle 14, including fault codes, sensor data and diagnostic results. It is possible to deliver downloaded software update packages via the vehicle IP network, so the high-speed data transfer capability over the WiFi connection to either the authentication server 30 or the computing device 28 may be utilized for such purposes.

The particulars shown herein are by way of example and for purposes of illustrative discussion of the embodiments of the security gateway adapter and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. An adapter device bi-directionally interconnecting a diagnostic scan tool to an electronic control unit through a security gateway of a vehicle, the adapter device comprising:

a scan tool interface connectible to the diagnostic scan tool;

a vehicle network interface connectible to a data link connector of the vehicle;

a wireless communications module connectible to a remote server;

a security gateway bypass opening and maintaining a validated communication link session with the security gateway through the vehicle network interface based upon a presentation of an access credential thereto received from the remote server in response to an authentication request including a security authorization token, the validated communication link session being maintained in an open state by the security gateway bypass to permit bidirectional communications between the diagnostic scan tool and the electronic control unit through the validated communication link session; and a data transfer and control processor receptive to scan tool commands and data from the diagnostic scan tool through the scan tool interface and relayed to the electronic control unit over the validated communication link session, and to vehicle data from the electronic control unit through the vehicle network interface over the validated communication link session and relayed to the diagnostic scan tool through the scan tool interface.

2. The adapter device of claim 1, wherein the wireless communications module is connectible to a computing device, the computing device being in communication with the remote server.

3. The adapter device of claim 2, wherein the wireless communications module includes a first wireless modality transceiver establishing a first stage wireless communications link with the computing device and a second wireless modality transceiver establishing a second stage wireless communications link with the computing device based upon data exchanged over the first stage wireless communications link.

4. The adapter device of claim 1, wherein the wireless communications module connects to the remote server directly over a network link.

5. The adapter device of claim 1, further comprising a power supply receptive to a power signal provided on the vehicle network interface.

6. The adapter device of claim 1, wherein the security gateway bypass is receptive to the security authorization token as generated by the security gateway and relayed to the remote server by the security gateway bypass through the wireless communications module.

7. The adapter device of claim 1, wherein:

the scan tool commands and data from the diagnostic scan tool conforms to a first protocol, the data transfer and control processor translating the scan tool commands and data to a second protocol for relaying to the electronic control unit; and the vehicle data from the electronic control unit conforms to the second protocol, the data transfer and control processor translating the vehicle data to the first protocol for relaying to the diagnostic scan tool.

8. The adapter device of claim 7, wherein the first protocol is an Onboard Diagnostics-II (OBDII) protocol, and the second protocol is the Onboard Diagnostics-Unified Diagnostic Services (OBDonUDS) protocol.

9. The adapter device of claim 7, wherein the second protocol is a Diagnostics over Internet Protocol (DoIP), and the data transfer and control processor emulates a node in a DoIP network, the validated communication link session being an extension of the DoIP network established by the security gateway and other DoIP nodes corresponding to the electronic control units.

10. The adapter device of claim 1, wherein the access credential includes vehicle location data retrieved from the electronic control unit of the vehicle.

11. A method for establishing a bi-directional communication session between a diagnostic scan tool and a security gateway of a vehicle over a security gateway adapter, the method comprising:

connecting the security gateway adapter to a data link connector of the vehicle;

retrieving an access credential from a remote server;

presenting the access credential to the security gateway;

opening a validated communication link session with the security gateway;

maintaining, by the security gateway adapter, the validated communication link session with the security gateway in an open state to permit bidirectional communications between the diagnostic scan tool and one or more electronic control units through the validated communication link session without the diagnostic scan tool presenting the access credential to the security gateway;

receiving scan tool commands and data from the diagnostic scan tool;

transmitting the scan tool commands and data to the electronic control units of the vehicle over the validated communication link session with the security gateway, the electronic control units being connectible to the security gateway adapter indirectly through the security gateway;

receiving vehicle data from the electronic control units of the vehicle over the validated communication link session with the security gateway; and transmitting the vehicle data to the diagnostic scan tool.

12. The method of claim 11, wherein the access credential is provided by the remote server in response to an authentication request including a security authorization token.

13. The method of claim 12, wherein the security authorization token is retrieved from the security gateway.

14. The method of claim 11, wherein the access credential includes vehicle location data retrieved from one or more of the electronic control units of the vehicle.

15. The method of claim 11, wherein:

the scan tool commands and data from the diagnostic scan tool conforms to a first protocol; and the vehicle data from one or more of the electronic control units conforms to a second protocol.

16. The method of claim 15, further comprising:

translating the scan tool commands and data to a second protocol for relaying to one or more of the electronic control units; and translating the vehicle data to the first protocol for relaying to the diagnostic scan tool.

17. The method of claim 16, wherein the first protocol is an Onboard Diagnostics-II (OBDII) protocol, and the second protocol is the Onboard Diagnostics-Unified Diagnostic Services (OBDonUDS) protocol.

18. The method of claim 16, wherein the second protocol is a Diagnostics over Internet Protocol (DoIP), and the security gateway adapter emulates a node in a DoIP network, the validated communication link session being an extension of the DoIP network established by the security gateway and other DoIP nodes corresponding to the electronic control units.

19. A vehicle security gateway auxiliary access system, comprising:

a security gateway adapter connectible to a diagnostic scan tool and a vehicle network interface of a vehicle, the security gateway adapter including a wireless communications module; and a computing device connectible to the wireless communications module of the security gateway adapter over a first modality and a second modality, the computing device further being connectible to a remote server to retrieve an access credential provided thereby in response to a presentation of an authentication request including a security authorization token retrieved from the vehicle;

wherein the access credential is presented by the security gateway adapter to the security gateway to establish and maintain a validated communication link session, the validated communication link session being maintained in an open state by the security gateway adapter to permit bidirectional communications between the diagnostic scan tool and electronic control units through the validated communication link session;

wherein scan tool commands and data from the diagnostic scan tool are relayed to the electronic control units behind the security gateway over the validated communication link session, and vehicle data from one or more of the electronic control units is relayed to the diagnostic scan tool over the validated communication link session.

20. The vehicle security gateway auxiliary access system of claim 19, wherein the security gateway adapter includes a first wireless modality transceiver establishing a first stage wireless communications link with the computing device and a second wireless modality transceiver establishing a second stage wireless communications link with the computing device based upon data exchanged over the first stage wireless communications link.

21. An article of manufacture comprising a non-transitory program storage medium readable by a computing device, the medium tangibly embodying one or more programs of instructions executable by the device to perform a method for establishing a bi-directional communication session between a diagnostic scan tool and a security gateway of a vehicle over a security gateway adapter, the method comprising:

establishing a first local area communication link to the security gateway adapter;

connecting to a remote server over a remote communication link;

retrieving an access credential from the remote server over the remote communication link in response to an authentication request received from the security gateway adapter over the local area communication link, the authentication request including a security authorization token specific to the security gateway and the access credential corresponding to the security authorization token; and transmitting the access credential to the security gateway adapter over the first local area communication link for presentation by the security gateway adapter to the security gateway to establish and maintain a validated communication link session with the security gateway, the validated communication link session being maintained in an open state by the security gateway adapter to permit bidirectional communications between the diagnostic scan tool and one or more electronic control units of the vehicle through the validated communication link session.

22. The article of manufacture of claim 21, further comprising:

transmitting network configuration data to the security gateway adapter over the first local area communication link, the network configuration data defining a second local area communication link serving as an intermediary to the remote communication link established by the security gateway adapter to connect to the remote server.

23. The article of manufacture of claim 22, wherein the first local area communication link is established at least partially in response to physical proximity of the computing device and the security gateway adapter, communication protocol parameters of the first local area communication link being concurrently negotiated without being predefined.

24. The article of manufacture of claim 23, wherein the second local area communication link is established over an existing network with predefined communication protocol parameters.

25. The article of manufacture of claim 21, further comprising:

receiving, from a user interface of the computing device, user account data; and transmitting the user account data to the remote server to establish an account thereon, the account being linked with the security authorization token.

* * * * *